United States Patent [19]
Willden

[11] Patent Number: 5,387,098
[45] Date of Patent: Feb. 7, 1995

[54] FLEXIBLE REUSABLE MANDRELS

[75] Inventor: Kurtis S. Willden, Kent, Wash.

[73] Assignee: The Boeing Company, Seattle, Wash.

[21] Appl. No.: 874,474

[22] Filed: Apr. 23, 1992

[51] Int. Cl.⁶ .................. B29C 53/82; B29C 67/14
[52] U.S. Cl. .................. 425/393; 264/257; 264/313; 425/403
[58] Field of Search .......... 425/403, 392, 393; 264/257, 258, 313, 295, 339, 285

[56] References Cited

U.S. PATENT DOCUMENTS

| | | | |
|---|---|---|---|
| 2,908,940 | 10/1959 | Jones | 425/403 |
| 3,583,187 | 6/1971 | Kontranowski | 72/58 |
| 3,678,146 | 7/1972 | Rottner et al. | 264/295 |
| 3,795,559 | 10/1971 | Horn et al. | 156/152 |
| 3,814,565 | 6/1974 | Cahour et al. | 425/393 |
| 3,999,912 | 12/1976 | Hall | 425/393 |
| 4,015,918 | 4/1977 | McPhee et al. | 425/403 |
| 4,030,871 | 6/1976 | Cobb | 425/388 |
| 4,080,141 | 3/1978 | Usui | 425/393 |
| 4,110,396 | 8/1978 | Reynolds | 264/339 |
| 4,160,006 | 7/1979 | Patzner et al. | 264/339 |
| 4,197,079 | 10/1978 | Patzner et al. | 425/393 |
| 4,298,330 | 10/1979 | Davis | 425/392 |
| 4,436,690 | 10/1981 | Davis | 264/313 |
| 4,500,485 | 2/1985 | Willemsen et al. | 425/393 |
| 4,738,816 | 11/1985 | Anderson | 264/313 |
| 4,746,386 | 5/1988 | Sato et al. | 425/393 |
| 5,022,845 | 6/1991 | Charlson et al. | 425/403 |

FOREIGN PATENT DOCUMENTS 61-263735  11/1986  Japan ............... 425/392

Primary Examiner—Jay H. Woo
Assistant Examiner—Duane S. Smith
Attorney, Agent, or Firm—Conrad O. Gardner

[57] ABSTRACT

A reusable laminate mandrel which is unaffected by extreme temperature changes. The flexible laminate mandrel is comprised of sheets stacked to produce the required configuration, a cover wrap that applies pressure to the mandrel laminate, maintaining the stack cross-section. Then after use, the mandrels can be removed, disassembled, and reused. In the method of extracting the flexible mandrel from one end of a composite stiffener, individual ones of the laminae of the flexible mandrel or all are extracted at the same time, depending on severity of the contour.

2 Claims, 3 Drawing Sheets

FLEXIBLE REUSABLE MANDRELS

The invention described herein was made in the performance of work under NASA Contract No. NAS1-18889 and is subject to the provisions of § 305 of the National Aeronautics and Space Act of 1958 as amended (42 U.S.C. 2457).

FIELD OF INVENTION

The present invention relates to mandrels used in assembly or curing of materials, and more particularly to a flexible reusable mandrel.

BACKGROUND ART

In the prior art patent literature, several devices relating to flexible mandrel methods are known, e.g.:

U.S. Pat. No. 4,197,079 (Patzner, et al.) describes a flexible core for producing crinkle-free tube bends which is comprised of laminates capable of being shifted against one another corresponding to the tube's inner bending radius. To facilitate handling, the laminates are held together by means of, for example, a length of tube which is movable along the laminates.

U.S. Pat. No. 4,030,871 (Cobb) shows an apparatus for thermoforming plastic parts. The device develops an over-hanging hollow portion, using stacked segments yielding into preselected turned relationship during the thermoforming process.

Currently, mandrels used in assembly and/or curing of materials are required to be extracted after use. Typically, hard or soft mandrels are not reusable after an elevated cure process, or they cannot be extracted over a contoured surface. The use of soft mandrels are easy to extract, but have a high coefficient of thermal expansion (CTE), which alters the dimension of material or part during the cure process. Hard mandrels can be made of low CTE material which controls the part geometry, but cannot be extracted over contoured surfaces unless the mandrel is segmented.

SUMMARY

It is accordingly an object of the present invention to provide a flexible mandrel having the advantages of hard and soft mandrels.

It is a further object of the present invention to provide a flexible mandrel having the following characteristics:
 a. extractable over-contoured surfaces;
 b. controlled CTE;
 c. reusable for production use;
 d. mandrel rigidity in a preferred direction for mandrel location/handling.

Other details, features, uses, objects, and advantages of this invention will become apparent from the embodiments thereof presented in the following specification, claims, and drawings.

DETAILED DESCRIPTION

Figure 1A:
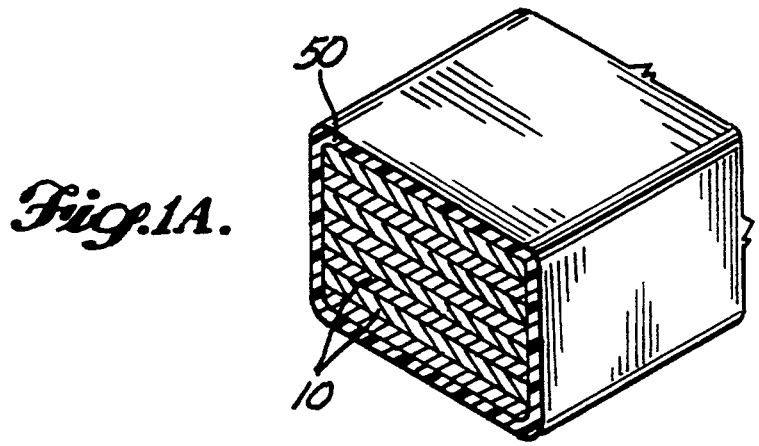
FIG. 1A is a perspective view of a first embodiment showing the end portion of the stacked laminates.
Figure 1B:
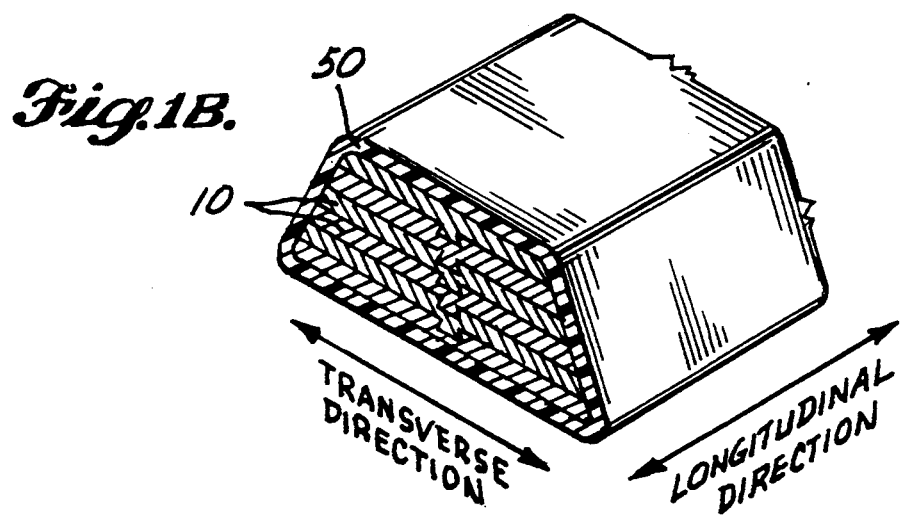
FIG. 1B is a perspective view of a second embodiment showing the end portion of the laminates in a tongue-and-groove configuration for eliminating movement in a transverse direction.
Figure 2:
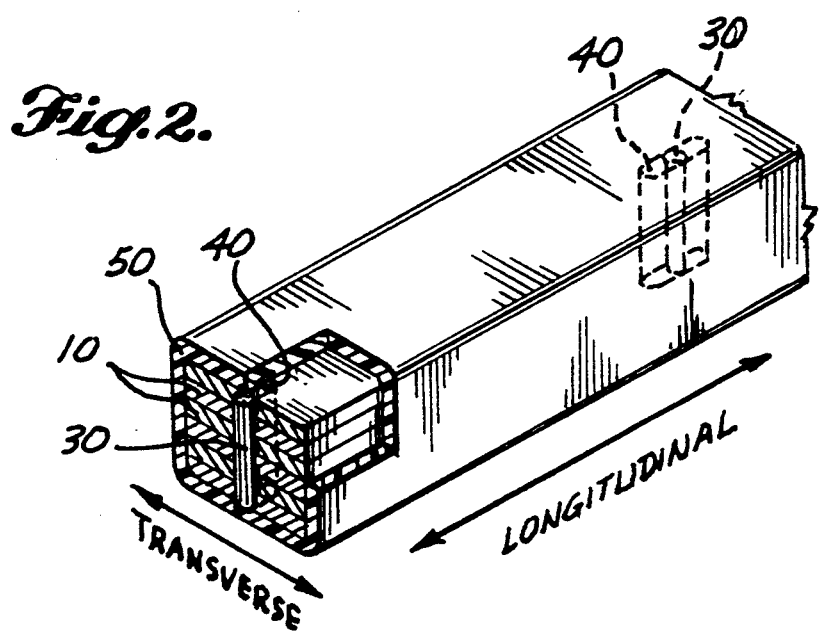
FIG. 2 is a perspective view of the embodiment of FIG. 1A showing pins in slots along the length of the mandrel for eliminating shift of the laminate stack in the transverse direction.

Turning now to FIG. 1A and FIG. 1B, it can be seen that the present mandrel utilizes a plurality of layers of laminates 10 stacked and machined to the desired cross-sectional shape. The layers of laminates 10 may be of the same material or of several materials to obtain a predetermined CTE (coefficient of thermal expansion). The cross-sectional shape of the mandrel must be maintained during use. This is accomplished by eliminating the transverse movement of the individual laminae 10. In the embodiment of FIG. 1B, a tongue-and-groove arrangement of the laminae 10 stack eliminates transverse mobility of the individual laminae 10. To eliminate the stacks of laminae 10 in the embodiment of FIG. 1A from shifting in the transverse direction, pins 30 (as seen in the perspective view of FIG. 2) are disposed in slots 40 along the length of the mandrel. Pins 30 constrain transverse motion but permit laminate slip along the length or longitudinal direction. Slots 40 may penetrate the entire mandrel thickness. The laminate stack is enclosed within an outer casing 50. Casing 50 serves to prevent the curing materials from bleeding between mandrel laminates 10 and when a flexible undersized tube, with respect to the stack dimension, applies pressure to the laminate stack to maintain cross-sectional shape. The flexible undersized tube forming casing 50 should be of an elastic nature to help compact the laminate stack together.

Mandrel Use

Figure 3A:
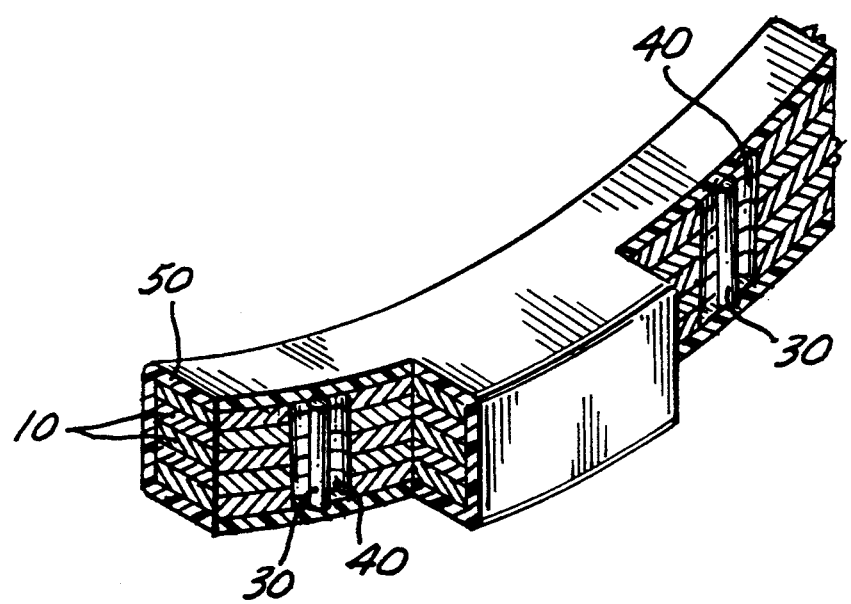
FIGS. 3A and 3B are side views in varying bent conditions illustrative of flexibility of the mandrel of FIGS. 1A and 2 showing laminates with pins in slots and outer casing.
Figure 3B:
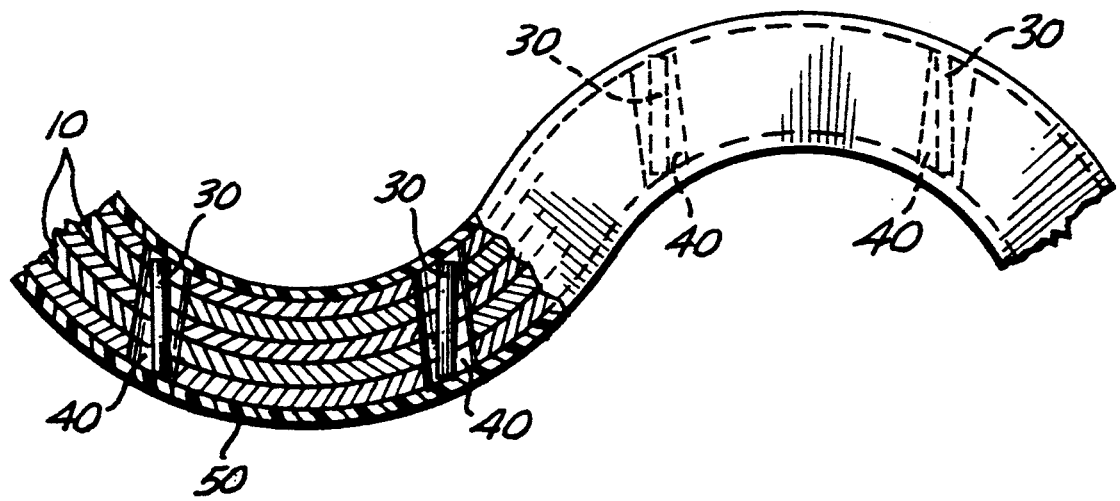

The present mandrels can be utilized for curing/co-bonding low or high temperature composite materials, such as stiffened skin structure. An example of the use of the present mandrels is shown in FIGS. 3A, 3B, 4A, and 4B. The flexibility of the present mandrel is depicted in FIGS. 3A and 3B, which show the laminae 10 slipping past each other to form an arc. Slot 40 design can ensure that the shift of laminae 10 does not hit the pins 30 causing a binding condition to occur.

Figure 4A:
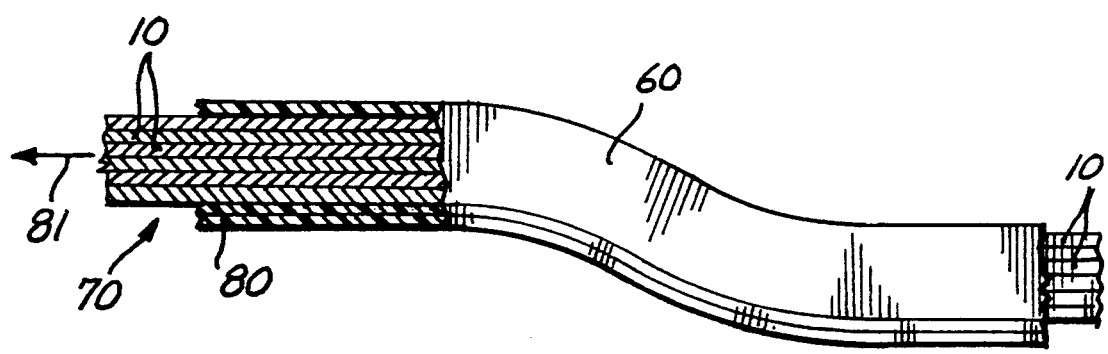
FIG. 4A is a side view.
Figure 4B:
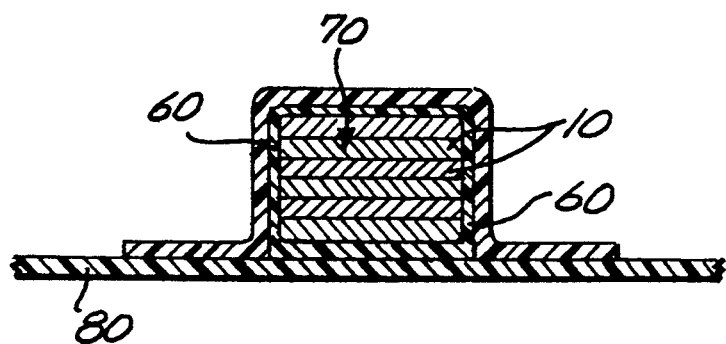
FIG. 4B is an end view, of the fabrication of a stiffened structure utilizing mandrels according to the present invention.

FIG. 4A in side view and FIG. 4B in end view are illustrative of the fabrication of a stiffened structure, which requires a curing mandrel to create an enclosed stiffened structure. The material, which is a composite stiffener 60, is positioned onto flexible mandrel 70. Flexible mandrel 70 is then positioned onto skin. The assembly is then cured and flexible mandrel 70 is extracted from one end of stiffener 60. The laminae 10 flex as flexible mandrel 70 is extracted over a contoured composite skin 80 (side view FIG. 4A). An alternative extraction approach is the extraction of individual laminae 10 in the longitudinal direction (represented by arrow 81).

Additional features and advantages of the present flexible mandrels will become apparent to those skilled in the art upon a study of the above-disclosed embodiments of the invention.

Current fabrication of composite laminated structure require a forming tool to make elements similar to stiffeners 60. The flexible mandrel can serve not only as the cure mandrel, but also as the forming tool, thereby minimizing the number of tools used and reducing the laminate handling between tool transverse.

The thermal expansion of the present flexible laminate mandrels can be tailored to meet a range of predetermined CTE values. The following chart shows the CTE values for various materials that may be used in constructing the present flexible mandrels.

| Material Type | Expansion Coefficient ($\times 10^{-6}$ in/in/°f.) |
| --- | --- |
| Aluminum | 12.5 |
| Steel | 7.9 |
| Invar 36 | 1.5 |
| Fiberglass/epoxy | 7.9 |
| Silicon | 150 |

If the desired CTE was 15 ($\times$in/in/°F.) then the laminate stack could consist of be aluminum laminae and silicon cover. The thickness of silicon wrap or casing around the laminate stack could be calculated to increase the effective CTE of the mandrel system to 15 ($\times$in/in/°F.). If more thermal expansion is required, then the silicon thickness would be increased, or aluminum laminae could be replaced with another material of higher CTE values to acquire the same value.

The use of various materials may be required to meet additional design criteria, such as mandrel weight. If a lightweight mandrel with a CTE value of 8.5 is required, then a composite of aluminum and fiberglass with a silicon wrap can be constructed. Materials other than silicon can be used for the mandrel casing to obtain the desired CTE value.

While present exemplary embodiments of this invention, and methods of practicing the same, have been illustrated and described, it will be recognized that this invention may be otherwise variously embodied and practiced within the scope of the following claims.

What is claimed is:

1. A flexible mandrel for use in curing of composite materials which may be extracted after use comprising:
    a stack of a plurality of laminate sheets;
    a flexible casing enveloping and applying pressure to said stack, thereby maintaining stack cross-sectional area; and
    means for preventing movement of said stack in the transverse direction while permitting shift of said stack of a plurality of laminate sheets in the longitudinal direction;
    wherein said means for preventing movement of said stack in the transverse direction comprises pins disposed in slots along the longitudinal direction of said stack.

2. A flexible mandrel for use in curing of composite materials which may be extracted after use comprising:
    a stack of a plurality of laminate sheets;
    a flexible casing enveloping and applying pressure to said stack, thereby maintaining stack cross-sectional area; and
    means for preventing movement of said stack in the transverse direction while permitting shift of said stack of a plurality of laminate sheets in the longitudinal direction;
    wherein said means for preventing movement of said stack in the transverse direction comprises tongue-and-grooved configured laminate sheet arrangement of said stack.

* * * * *